May 6, 1924.
A. GANGWISCH
TRAP AND TRIGGER THEREFOR
Filed Dec. 1, 1922
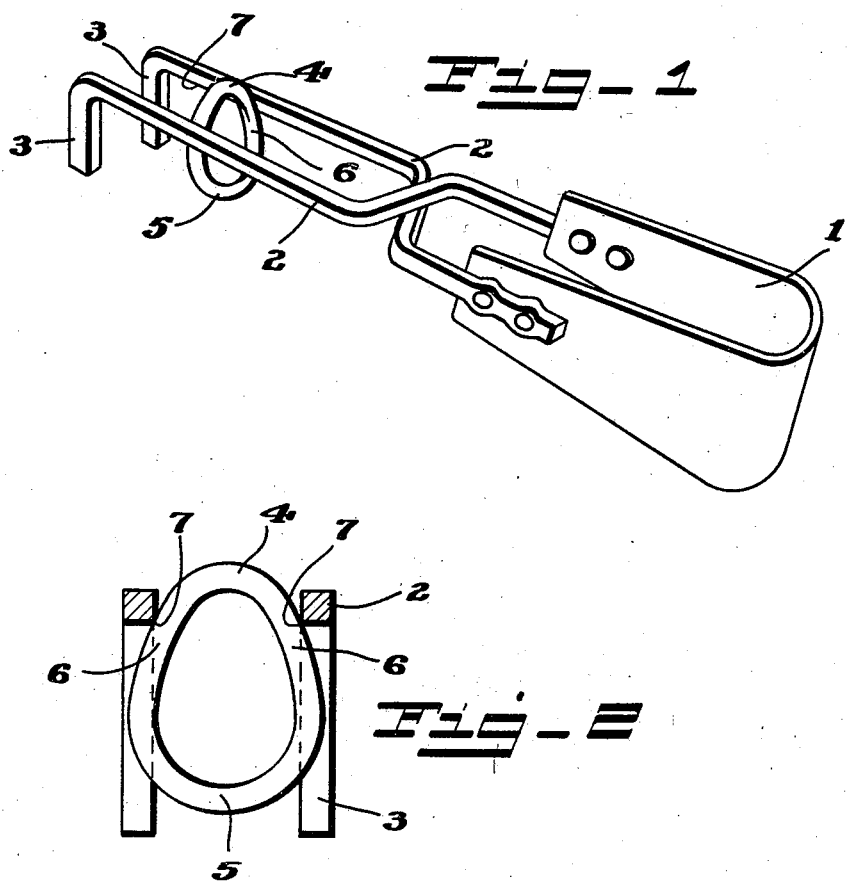
Inventor
Albert Gangwisch
By H.L. & C.L. Reynolds
Attorneys Patented May 6, 1924.

1,492,788

UNITED STATES PATENT OFFICE.

ALBERT GANGWISCH, OF SEATTLE, WASHINGTON.

TRAP AND TRIGGER THEREFOR.

Application filed December 1, 1922. Serial No. 604,361.

*To all whom it may concern:*

Be it known that I, ALBERT GANGWISCH, a citizen of the United States of America, and resident of the city of Seattle, in the county of King and State of Washington, have invented certain new and useful Improvements in Traps and Triggers Therefor, of which the following is a specification.

My invention relates to an improvement in traps for catching small animals, such as gophers or moles, and in the triggers therefor, and is particularly an improvement upon my co-pending application Serial No. 259,468, filed October 24, 1918.

The principal object of my present invention is to provide a trigger for use in connection with such a trap as is shown in my co-pending application, which will be more sensitive, to the end that the trap may be more easily and certainly tripped.

My invention comprises the improved trigger and the combination thereof with my trap, as shown in the accompanying drawings, described in this specification, and particularly defined by the claims terminating the same.

In the accompanying drawings I have shown my invention in the form which is now preferred by me.

Figure 1 is a perspective view of my trap and trigger shown in the set position.

Figure 2 is an elevation of the trigger, the cooperating parts of the trap being shown in section.

The trap is but little changed from the form shown in my application referred to above. It comprises a U-shaped spring member 1 to which is secured a pair of jaws 2, these being preferably crossed, and terminating in downward extensions 3, the latter being intended to grip the body of the animal. It should be noted, however, that the jaws 2 and their extensions 3 are all of plain material and have no teeth or other projections designed to grip the animal. I have found that such projections serve no useful purpose, inasmuch as the spring 1 may be made strong enough to kill the animal outright when caught between the jaws 2 and I have discovered also that moles, gophers and the like, for which my trap is designed, will not pass by teeth or like projections, and consequently a trap employing such teeth is useless.

The egg shape outline of the trigger makes it possible by setting it with either small or large end up, to vary the separation of the jaws to suit varying conditions. One animal runway is apt to be wider than another and more or less beneath the surface. Where the runway is narrow, by placing the smaller end of the trigger between the side arms, the separation of the terminal jaws may be reduced to fit the width of runway. By similar adjustment of the position of the trigger, its extent below the arms may be varied to fit a deep or shallow runway. The peculiar shape of the trigger therefore adds very materially to the adaptability of the trap to varying conditions and therefore to its efficiency.

Whether the trigger be placed with the smaller end up or down, it is preferably placed so that at the points of contact between trigger and arms, the contacting surfaces are not parallel, but make an angle to each other, thereby increasing the sensitiveness of the trigger.

Preferably, although not necessarily, the jaws 2 at this point at least, are made square or have a corner, as 7, projecting inwardly, with which the sides 6 of the ring or trigger may be engaged.

By reason of the egg-shape of the ring, the trigger may be set in differing positions to thereby vary the separation of the jaws 3, and also to vary the amount of the extension of the trigger below the arms 2. By reason of this egg-shape and the fact that the axis of the ring, whether major or minor, is placed without the common plane of the arms 2, pivotal turning of the trigger without tripping the trap is impossible. In consequence a light touch and very slight movement of the ring 5 will suffice to release the trigger. The trap is thus rendered very sensitive and efficient.

What I claim as my invention is:

1. An animal trap comprising opposed spring-closed arms and a trigger of egg-shaped outline adapted to be placed between the arms to hold them separated, said trigger being adapted to be placed either end up to thereby vary its extent below the level of the side arms.

2. An animal trap comprising two opposed and spring-closed arms having laterally projecting animal-clamping jaws at one end and a trigger of egg-shaped outline adapted to be inserted between the arms to hold them separated, the two points of contact between the arms and trigger being upon one side of that axis of the trigger which extends transversely of the arms.

Signed at Seattle, King County, Washington, this 25th day of November, 1922.

ALBERT GANGWISCH.